Patented Oct. 10, 1933

1,929,853

UNITED STATES PATENT OFFICE 1,929,853

AZO DYESTUFF

Hans Reindel, Ludwigshafen-on-the-Rhine, and Hans Krzikalla, Mannheim, Germany, assignors to General Aniline Works, Inc., New York, N. Y., a corporation of Delaware No Drawing. Application March 22, 1932, Serial No. 600,560, and in Germany March 26, 1931

6 Claims. (Cl. 260—86)

The present invention relates to new azo dyestuffs and process of producing the same.

We have found that azo dyestuffs yielding dyeings of very good fastness to washing and fulling are obtained by coupling a diazotized aromatic amine containing an acylamino group of an aliphatic carboxylic acid containing at least 10 carbon atoms with a sulphonated ketone capable of coupling, i. e. a ketone capable of forming an enolic isomeric compound. Coupling components of the said kind are, for example, sulphonic acids of phenylmethylpyrazolone, phenylpyrazolone carboxylic acid, aceto-acetic acid arylide and the like. As aromatic amines containing an acylamino group of the aforesaid kind which on diazotization may be used for the preparation of the dyestuffs, preferably those of the benzene and naphthalene series, are employed. They may be prepared by condensing an aromatic diamine with an aliphatic carboxylic acid containing at least 10 carbon atoms, or preferably with the acid halide of the said acids. Thus, for the said condensation the chloride of capric, lauric, palmitic, margaric and stearic acid, or of unsaturated aliphatic acids, such as oleic, elaidic, ricinoleic, linoleic acid, or the acid present in soya bean oil may be used.

The following examples will further illustrate the nature of this invention but the invention is not restricted thereto. The parts are by weight.

Example 1

37.2 parts of para-aminolauric acid anilide are dissolved in glacial acetic acid or formic acid and diazotized with an aqueous solution of 7 parts of sodium nitrite while adding hydrochloric acid; the diazo solution may be slowly poured directly into a solution of about 28 parts of 1-(meta-sulphophenyl)-3-methyl-5-pyrazolone containing a sufficient amount of soda; the coupling is completed very rapidly. A yellow dyestuff is obtained which dyes wool very fast yellow shades.

The dyestuff with 1-(para-sulpho-phenyl)-5-pyrazolone-3-carboxylic acid which yields somewhat more red shades is obtained in a similar manner.

Example 2

37.4 parts of para-aminostearic acid anilide are diazotized as described in Example 1 and coupled with 30 parts of acetoacetic-ortho-anisidide sulphonic acid in a solution rendered alkaline with soda. A yellow dyestuff is obtained which dyes wool fast yellow shades.

Other acetoacetic arylide sulphonic acids may be worked up into good dyestuffs in an analogous manner.

What we claim is:

1. Azo dyestuffs corresponding to the general formula:

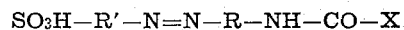

in which R stands for an aromatic radicle of the benzene or naphthalene series, X stands for an aliphatic radicle containing at least 9 carbon atoms and R' for the radicle of a ketone capable of coupling.

2. Azo dyestuffs corresponding to the general formula:

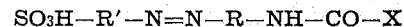

in which R stands for a benzene radicle, X stands for an aliphatic radicle containing at least 9 carbon atoms and R' for the radicle of a ketone capable of coupling.

3. Azo dyestuffs corresponding to the general formula:

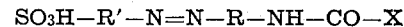

in which R stands for a benzene radicle, X stands for an aliphatic radicle containing at least 9 carbon atoms and R' for the radicle of an aceto-acetic arylide.

4. Azo dyestuffs corresponding to the general formula:

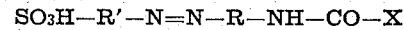

in which R stands for a benzene radicle, X stands for an aliphatic radicle containing at least 9 carbon atoms and R' for the radicle of a pyrazolone.

5. The azo dyestuff corresponding to the formula:

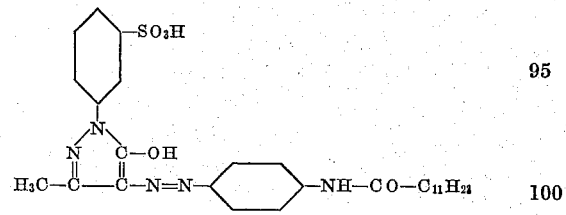

dyeing wool very fast yellow shades.

6. The azo dyestuff corresponding to the formula:

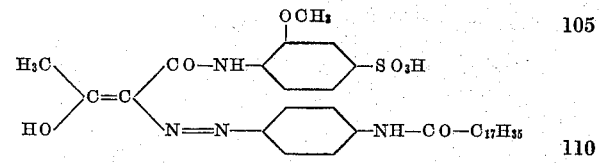

dyeing wool fast yellow shades.

HANS REINDEL.
HANS KRZIKALLA.